United States Patent [19]

Brunnert

[11] Patent Number: 5,080,451
[45] Date of Patent: Jan. 14, 1992

[54] DRAWER GUIDE FITTING

[75] Inventor: Eberhard Brunnert, Elchingen, Fed. Rep. of Germany

[73] Assignee: Julius Blum Gesellschaft m.b.H., Höchst, Austria

[21] Appl. No.: 530,394

[22] Filed: May 30, 1990

[30] Foreign Application Priority Data

May 30, 1989 [AT] Austria ................................. 1297/89

[51] Int. Cl.⁵ ............................................. A47B 77/08
[52] U.S. Cl. ...................................... 312/223; 312/319
[58] Field of Search ................................. 312/319, 223

[56] References Cited

U.S. PATENT DOCUMENTS 3,005,672 10/1961 Becker ................................. 312/223

Primary Examiner—Joseph Falk
Attorney, Agent, or Firm—Wenderoth, Lind & Ponack

[57] ABSTRACT

A drawer guide fitting with a pull-out track (2) on the drawer and a support track (4) on the body, at each side of the drawer (6). The weight of the drawer (6) is transmitted by the pull-out tracks (2) by means of runners (1, 3) to the support tracks (4). A retraction device for the drawer is provided, which comprises a linear motor (5).

7 Claims, 4 Drawing Sheets

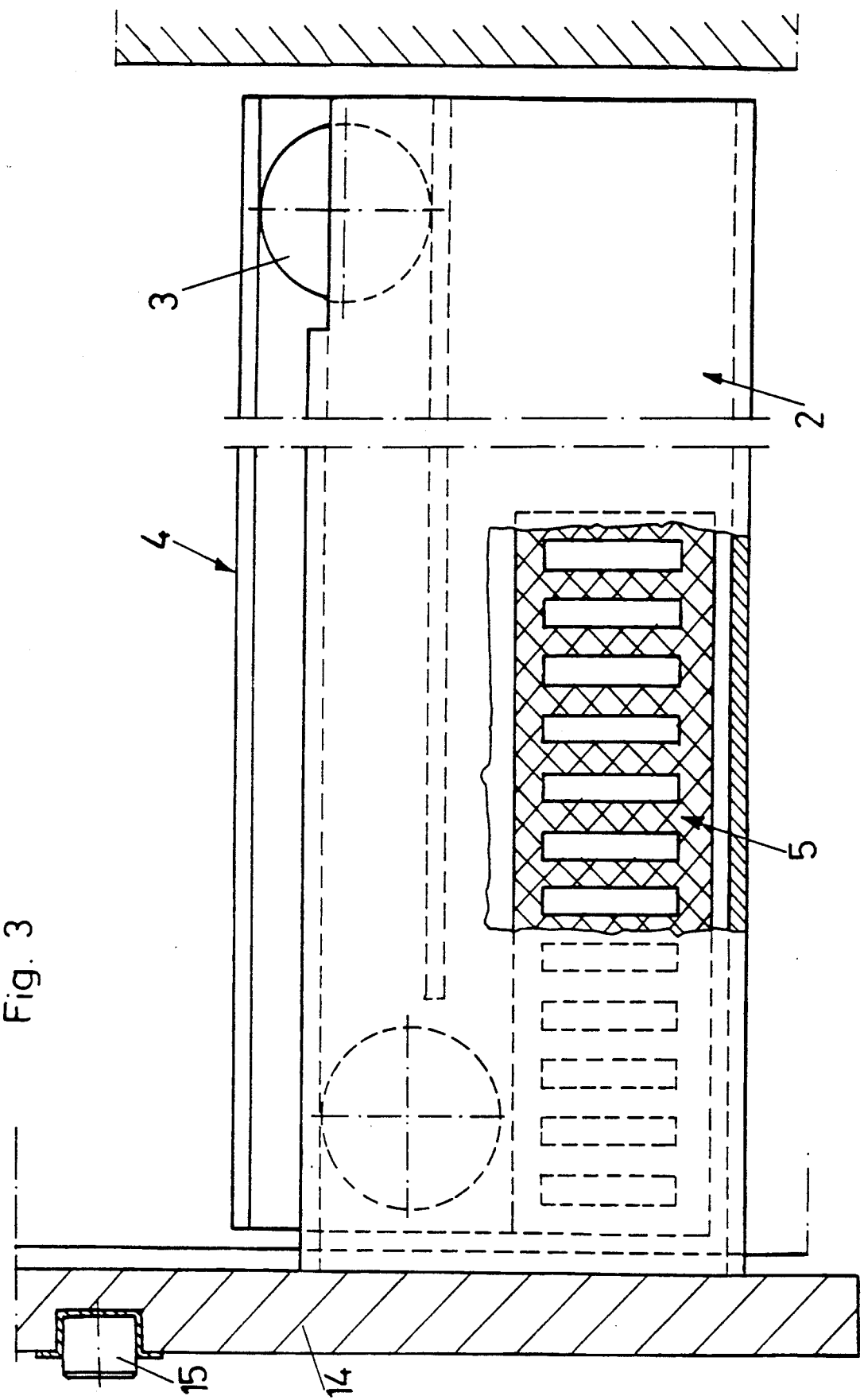

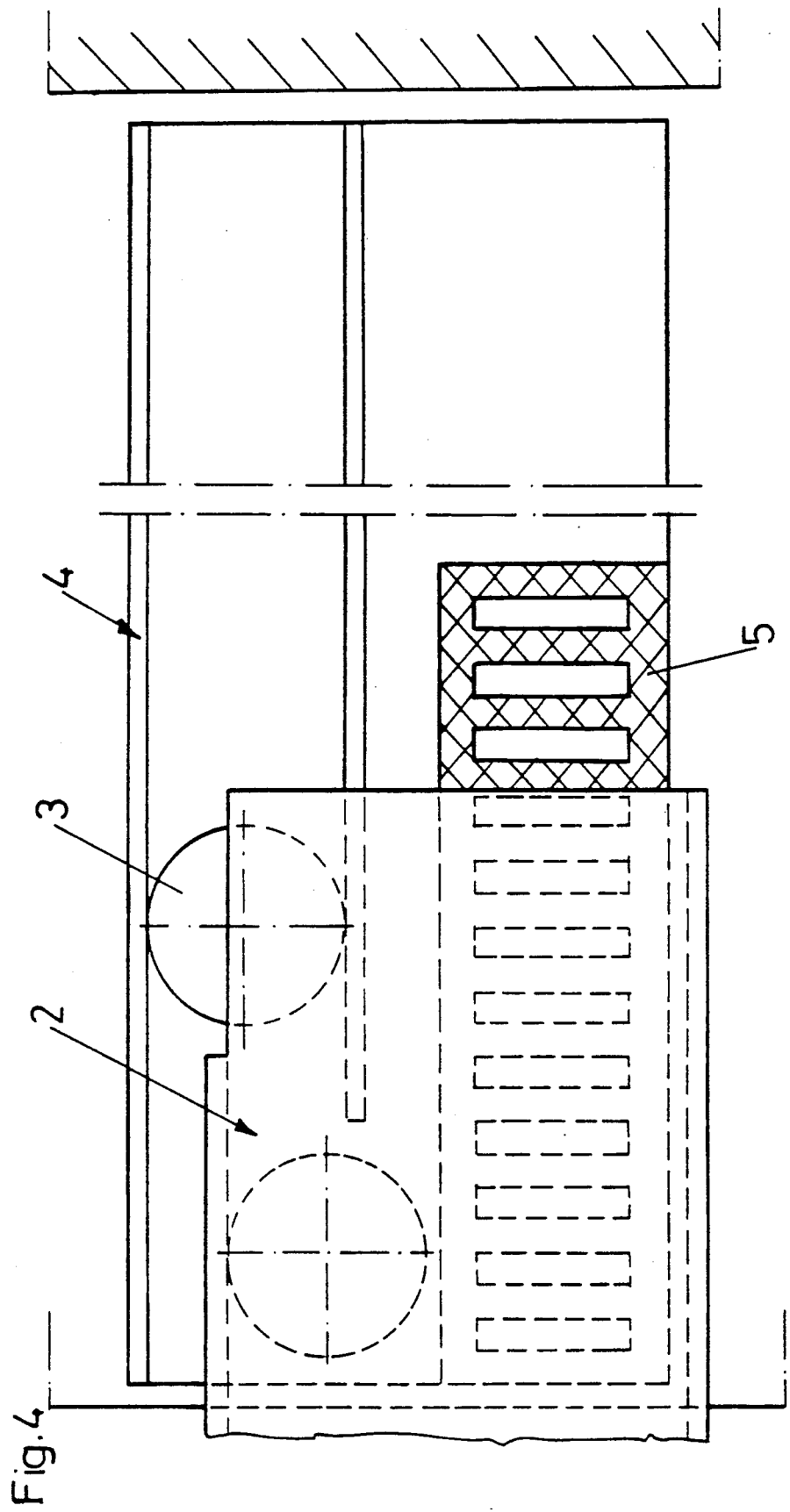

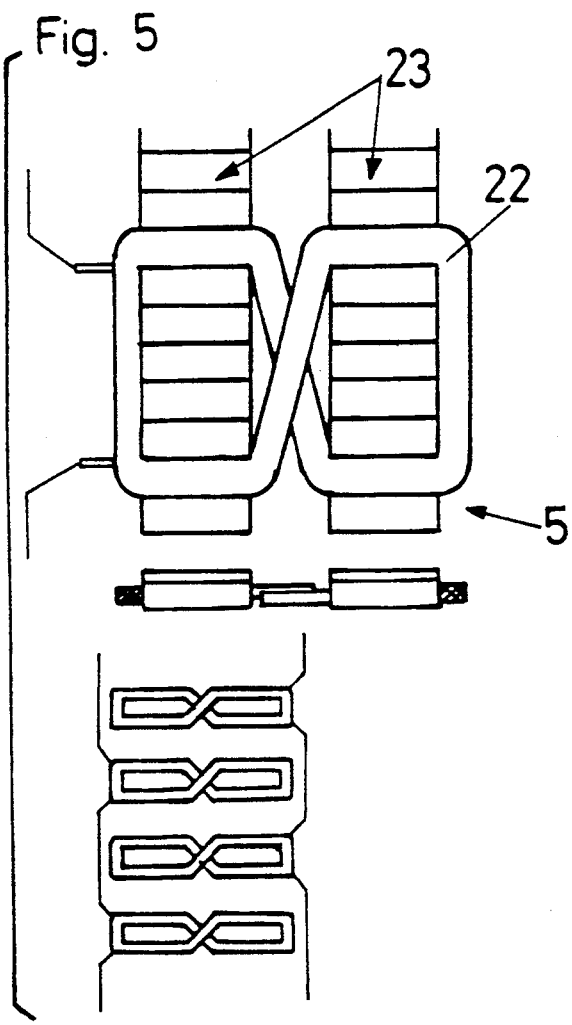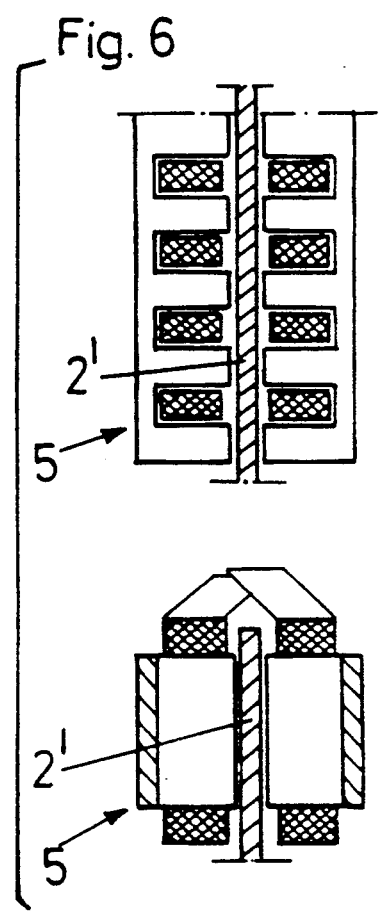

DRAWER GUIDE FITTING

FIELD AND BACKGROUND OF THE INVENTION

The invention relates to a drawer guide fitting with a pull-out track on the drawer and a support track on the body, on each side of the drawer, the weight of the drawer being transmitted by the pull-out tracks by means of runners to the support tracks, with a retraction device for the drawer comprising an electric motor.

Modern drawers are provided with a pull-out guide fitting, which on both sides of the drawer consists of a support track on the body and a pull-out track on the drawer and which is intended to make the sliding movement of the drawer as free-running as possible. Runners, balls or even slides may be provided for the transmission of the load between the pull-out tracks on the drawer and the support tracks on the body, according to the requirements made with respect to easy running and load on the drawer.

It has been shown that in many cases closed drawers have not fully entered the rear end position, i.e. in the body and project by their front wall from the body of the piece of furniture. This can have the result that someone bumps against the drawer, which can in turn lead to injury to the person or damage to the drawer.

The protrusion of the front wall of the drawer from the front of the piece of furniture may be the result of the fact that the drawer was pushed into the body of the piece of furniture solely carelessly and not completely. However, even if the drawer was pushed with too much force into the body of the piece of furniture, due to the excess energy the drawer may once more roll forwards.

British Patent Specification 1 117 071 discloses a device for keeping a drawer closed, in which a tilting part able to move between two end positions is provided. The tilting part is acted upon by a helical spring and after overcoming a dead center is pushed by the latter into the respective end position. The tilting part is attached to one side wall of the piece of furniture. On the side wall the drawer comprises an entrainment pin, which in the end region of the travel of the drawer is introduced into a notch in the tilting part. Then the entrainment pin pushes the tilting part beyond a dead center position, whereupon the tilting part itself pulls the entrainment pin and thus the drawer rearwards.

SUMMARY OF THE INVENTION

It is the object of the invention to provide an improved closing device. It is intended to produce the retraction of the drawer independent of force.

The object according to the invention is achieved due to the fact that the electric motor is a linear motor, at least one pull-out track, which consists of electrically conducting material, comprising a web, which projects into a gap defined by a double stator of the linear motor.

The drawer can be pushed in and pulled out according to the magnetic travelling field, whereof the direction of travel is formed optionally by an electrical winding wiring.

Advantageously it is also provided that the vertical web lies opposite the running web of the pull-out track. A further embodiment of the invention provides that the double stator of the linear motor extends in the longitudinal direction at most over half the length, advantageously over one third of the length of the support track and is located on the support track at the front.

The linear motor comprises for example a three-phase winding (DLS=rotary current linear motor), which receives three phase-shifted alternating voltages by way of a reversible capacitor from a single-phase alternating current supply, with which a magnetic travelling field is produced in the three-phase stator, the direction of travel of which field can be determined by the switch, because the operating capacitor is optionally connected by the latter in parallel to two winding phases.

The electrical actuating switch is preferably attached to the front wall. In order to be able to dispense with a movable signal lead between the actuating switch and the linear motor on the body, as well as with a current supply, a capacitive potential circuit with electronic signal processing is offered. The contact sensor of the wall switch is connected in an electrically conducting manner to the pull-out track, which in conjunction with the plane parallel stator core forms a capacitive image, which upon contact of the sensor passes along the body potential of the user to the signal processing arrangement.

A winding design which is favourable from the manufacturing point of view provides that partial coils of the multi-phase double stator linear motor are not designed separately, as is conventional, but as closed double coils for both stator halves. Furthermore, the partial coils are not wound individually but continuously from one wire, in order to save on soldering of the partial coils.

BRIEF DESCRIPTION OF THE FIGURES OF THE DRAWING

One embodiment of the invention will be described hereafter with reference to the Figures of the accompanying drawings.

FIG. 3 is a side view of the drawer guide fitting according to the invention, with the drawer closed.

FIG. 4 is a side view of the drawer guide fitting with the drawer pulled out.

FIG. 5 shows diagrammatically the design of the winding and

FIG. 6 shows the folded double winding.

DESCRIPTION OF THE PREFERRED EMBODIMENT

Figure 1:
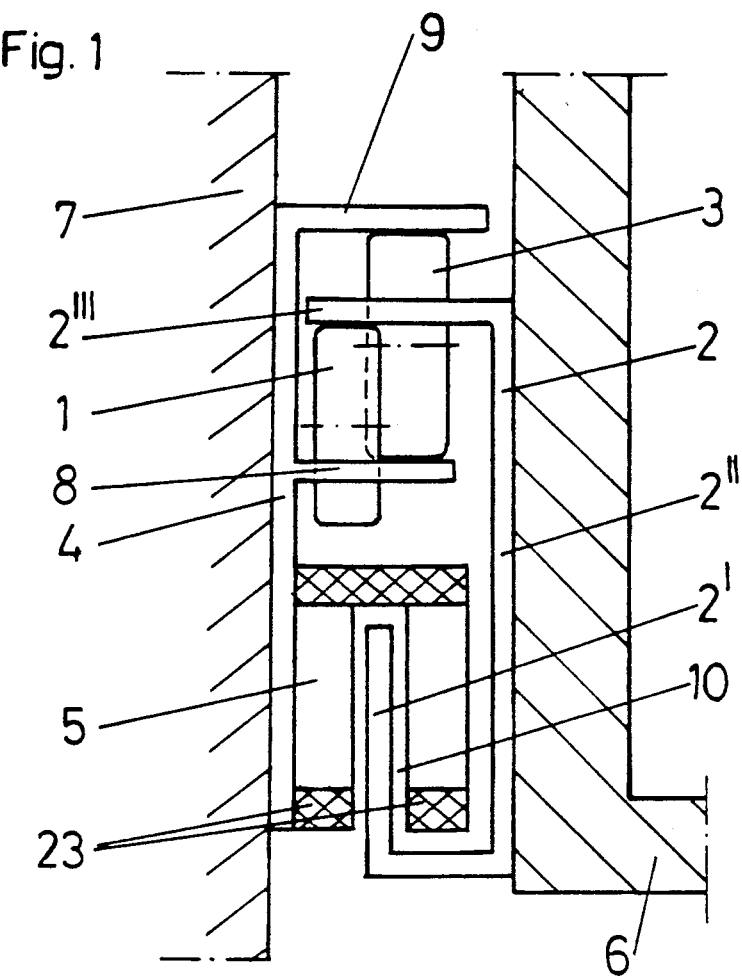
FIG. 1 is a vertical section through one side of a drawer guide fitting.

As shown particularly in FIG. 1, the pull-out track 2 is attached to the side wall of the drawer 6 and the support track 4 is attached to the side wall 7 of the body. The support track 4 has a F-profile, the runner 3 of the drawer 6 travelling between the two horizontal webs 8, 9.

The runner 1 on the body is attached to the support track 4 at the front.

The pull-out track 2 comprises a vertical web 2'', which serves for the attachment, an upper horizontal running web 2''' and opposite this horizontal running web 2'''' a vertical web 2'' projecting upwards.

As shown in FIGS. 3 and 4, the linear motor 5 is located on the lower side in the front region of the support track 4.

The linear motor 5 is constructed as a double stator and projecting into the gap 10, which is formed by the double stator of the linear motor 5, is the vertical web 2' of the pull-out track 2. Naturally the pull-out track 2 is made from electrically conducting material, for example steel.

Figure 2:
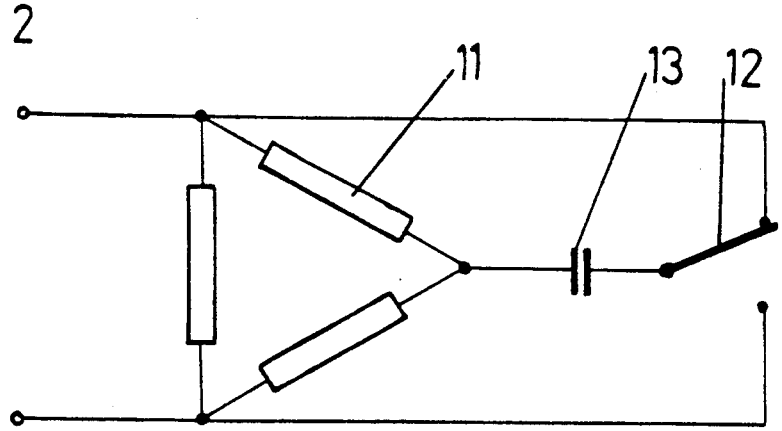
FIG. 2 is a diagram of a three-phase winding.

FIG. 2 shows the three-phase winding of the linear motor 5, the windings being designated by the reference numeral 11. A travelling field is produced in the linear motor 5, whereof the direction of travel is determined by the switch 12. By the switch 12, the operating capacitor 13 is connected optionally in parallel to two winding phases.

An actuating switch 15 is advantageously located on the front wall 14 of the drawer 6, for actuating the linear motor 5. The actuating switch 15 is connected in an electrically conducting manner to the pull-out track 2. Since the actuating switch 15 is constructed as a sensor, the body potential of the user can be sent to the signal processing arrangement for actuating the linear motor 5. For pushing the drawer 6 in and pulling it out, it is therefore sufficient to contact the actuating switch 15, there is no need for any manual pulling-out or pushing-in of the drawer 6.

What is claimed is:

1. In a drawer guide assembly for use on a side of a drawer to be movable into and out of a furniture body, said assembly including a longitudinal support rail to be mounted on the furniture body, a longitudinal pull-out rail to be mounted on the drawer and movable along said support rail, and retraction means for moving said pull-out rail relative to said support rail and thereby for moving the drawer relative to the furniture body, the improvement wherein said retraction means comprises:

a winding mounting on said support rail and forming a double stator of a linear electric motor, said double stator defining therein a longitudinal gap, such that current flowing through said winding generates a magnetic field through said gap; and a longitudinal web of said pull-out rail being formed of electrically conductive material and extending into said gap, thereby defining a core of said motor, whereby said magnetic field causes movement of said web longitudinally of said gap.

2. The improvement claimed in claim 1, wherein the double stator extends in the longitudinal direction for at most half the length of said support rail at a front portion thereof.

3. The improvement claimed in claim 1, wherein said web is positioned opposite a running web of said pull-out rail.

4. The improvement claimed in claim 1, wherein said winding is a three-phase winding.

5. The improvement claimed in claim 4, further comprising an operating capacitor connected to said winding to be switched between selected two phases thereof.

6. The improvement claimed in claim 1, further comprising an actuating switch for said linear motor and adapted to be located on a front wall of the drawer.

7. The improvement claimed in claim 6, wherein said actuating switch is connected in an electrically conducting manner to said pull-out rail.

* * * * *